(12) United States Patent
Kang et al.

(10) Patent No.: US 10,139,969 B2
(45) Date of Patent: Nov. 27, 2018

(54) TOUCH PANEL INCLUDING MULTILAYER TOUCH SIGNAL LINE

(71) Applicant: Samsung Display Co., Ltd., Yongin-si (KR)

(72) Inventors: Ki Nyeng Kang, Seoul (KR); Jong Hyun Choi, Seoul (KR); Jeong-Hwan Kim, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 367 days.

(21) Appl. No.: 14/994,061

(22) Filed: Jan. 12, 2016

(65) Prior Publication Data

US 2016/0299599 A1    Oct. 13, 2016

(30) Foreign Application Priority Data

Apr. 13, 2015 (KR) .................. 10-2015-0051694

(51) Int. Cl.
*G06F 3/045* (2006.01)
*G06F 3/044* (2006.01)

(52) U.S. Cl.
CPC .... *G06F 3/044* (2013.01); *G06F 2203/04103* (2013.01)

(58) Field of Classification Search
CPC .................. G06F 3/044; G06F 2203/04103
See application file for complete search history.

(56) References Cited

U.S. PATENT DOCUMENTS

| | | | |
|---|---|---|---|
| 2011/0063782 A1* | 3/2011 | Hirai | G06F 3/044 361/679.01 |
| 2012/0044191 A1* | 2/2012 | Shin | G06F 3/044 345/174 |
| 2012/0081331 A1 | 4/2012 | Chae et al. | |
| 2013/0050137 A1* | 2/2013 | Yang | G06F 3/044 345/174 |
| 2013/0106813 A1* | 5/2013 | Hotelling | G06F 1/1626 345/207 |
| 2014/0028584 A1 | 1/2014 | Park et al. | |
| 2014/0152910 A1 | 6/2014 | Kang et al. | |
| 2014/0152912 A1* | 6/2014 | Lee | G06F 3/0412 349/12 |
| 2014/0368755 A1* | 12/2014 | Chen | G06F 3/044 349/12 |
| 2015/0145813 A1* | 5/2015 | Takiguchi | G06F 3/044 345/174 |

FOREIGN PATENT DOCUMENTS

| | | |
|---|---|---|
| KR | 10-2012-0033480 | 4/2012 |
| KR | 10-2014-0016070 | 2/2014 |
| KR | 10-2014-0070103 | 6/2014 |

* cited by examiner

*Primary Examiner* — Jonathan Blancha
(74) *Attorney, Agent, or Firm* — H.C. Park & Associates, PLC

(57) ABSTRACT

A touch panel includes: a substrate; touch electrodes disposed on the substrate, the touch electrodes being configured to sense a touch input; and touch signal lines each connected to one of the touch electrodes, the touch signal lines each including a fanout portion and a pad portion, the pad portion being electrically connected to a touch controller. Each of the fanout portion and the pad portion includes a first conductor, a second conductor disposed on the first conductor, and a third conductor disposed on the second conductor, and a passivation layer disposed on the third conductor.

19 Claims, 15 Drawing Sheets

Fan out

Pad

Fan out

Pad

Fan out          Pad

Fan out          Pad

Fan out          Pad

TOUCH PANEL INCLUDING MULTILAYER TOUCH SIGNAL LINE

CROSS-REFERENCE TO RELATED APPLICATION

This application claims priority from and the benefit of Korean Patent Application No. 10-2015-0051694, filed on Apr. 13, 2015, which is hereby incorporated by reference for all purposes as if fully set forth herein.

BACKGROUND

Field

Exemplary embodiments relate to a touch panel including a touch sensor, and a display device including the touch panel.

Discussion of the Background

A flat panel display (FPD), such as an organic light emitting diode display (OLED), a liquid crystal display (LCD), an electrophoretic display (EPD), or the like, includes a display panel on which an electric field generation electrode and an electro-optical active layer are disposed. As the electro-optical active layer, panels of the organic light emitting diode display, the liquid crystal display, and the electrophoretic display each include an organic light emitting layer, a liquid crystal layer, and charged particles, respectively. The electric field generation electrode may be connected to a switching element, such as a thin film transistor, or the like, so as to be applied with a data signal, and the electro-optical active layer displays an image by converting the data signal into an optical signal.

The above-mentioned display device may include a touch interface providing a touch sensing function and enabling an interaction with a user, in addition to an operation of displaying the image by a display panel. The touch sensing operation includes detecting touch information such as detecting whether an object touches a screen and detecting the touch location of the object by sensing a change in pressure applied to the screen by the display device, resistance, charge, light, or the like, in a case in which a user touches the screen with a finger or a touch pen. The display device may receive an image signal based on the touch information.

The touch sensing operation or touch sensing function may be implemented by a capacitive-type touch sensor including touch electrodes. In the capacitive-type touch sensor, the touch electrodes form a capacitor, and a touch controller connected to the touch electrodes through touch signal lines senses a change in capacitance of the capacitor caused by the touch. Touch information may be generated based on the above-mentioned change in capacitance or other types of touch sensing configurations.

A technology in which a nanowire is used as the touch electrode has been recently developed for a flexible display. The nanowire may also be used in the touch signal line, but since it is understood that resistance may be increased or the touch signal line may be disconnected due to a limit in the line width, the touch signal line may have a structure in which a low resistance metal is stacked on the nanowire.

Further, a panel in which the touch sensor is disposed may be referred to as a touch panel (also referred to as a touch sensor panel, a touch screen panel, etc.). A display panel having a touch sensor function is also referred to as the touch panel.

The above information disclosed in this Background section is only for enhancement of understanding of the background of the inventive concept, and, therefore, it may contain information that does not form the prior art that is already known to a person of ordinary skill in the art.

SUMMARY

Exemplary embodiments provide a touch panel with increased reliability of a touch sensor.

Exemplary embodiments provide a touch panel having a structure that may prevent corrosion and characteristic degradation of a touch signal line.

Additional aspects will be set forth in the detailed description which follows, and, in part, will be apparent from the disclosure, or may be learned by practice of the inventive concept.

An exemplary embodiment discloses a touch panel including: a substrate; touch electrodes disposed on the substrate, the touch electrodes being configured to sense a touch input; and touch signal lines each connected to one of the touch electrodes, the touch signal lines each including a fanout portion and a pad portion, the pad portion being electrically connected to a touch controller. Each of the fanout portion and the pad portion includes a first conductor, a second conductor disposed on the first conductor, and a third conductor disposed on the second conductor, and a passivation layer is disposed on the third conductor.

An exemplary embodiment also discloses a method for manufacturing a touch panel, the touch panel including touch electrodes and touch signal lines each connected to one of the touch electrodes, the touch signal lines each including a fanout portion and a pad portion, the method including: forming a first conductive layer on a substrate; forming and patterning a second conductive layer on the first conductive layer to form a second conductor of the fanout portion and a second conductor of the pad portion; forming and patterning a third conductive layer on the second conductors to form a third conductor of the fanout portion on the second conductor of the fanout portion and to form a third conductor of the pad portion on the second conductor of the pad portion; patterning the first conductive layer to form a first conductor of the fanout portion and a first conductor of the pad portion; and forming a passivation layer on the third conductors and the touch electrodes.

An exemplary embodiment further discloses a touch panel including: a substrate; a touch electrode disposed on the substrate, the touch electrode being configured to sense a touch input; a touch signal line connected to the touch electrode, the touch signal line including a fanout portion and a pad portion, the pad portion being electrically connected to a touch controller; and a passivation layer disposed on the touch signal line and the touch electrode. The fanout portion includes a first conductor extending from the touch electrode, a second conductor disposed on the first conductor of the fanout portion, and a third conductor disposed on the second conductor of the fanout portion, and the pad portion includes a first conductor extending from the first conductor of the fanout portion, a second conductor disposed on the first conductor of the pad portion and extending from the second conductor of the fanout portion, and a third conductor disposed on the second conductor of the pad portion.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
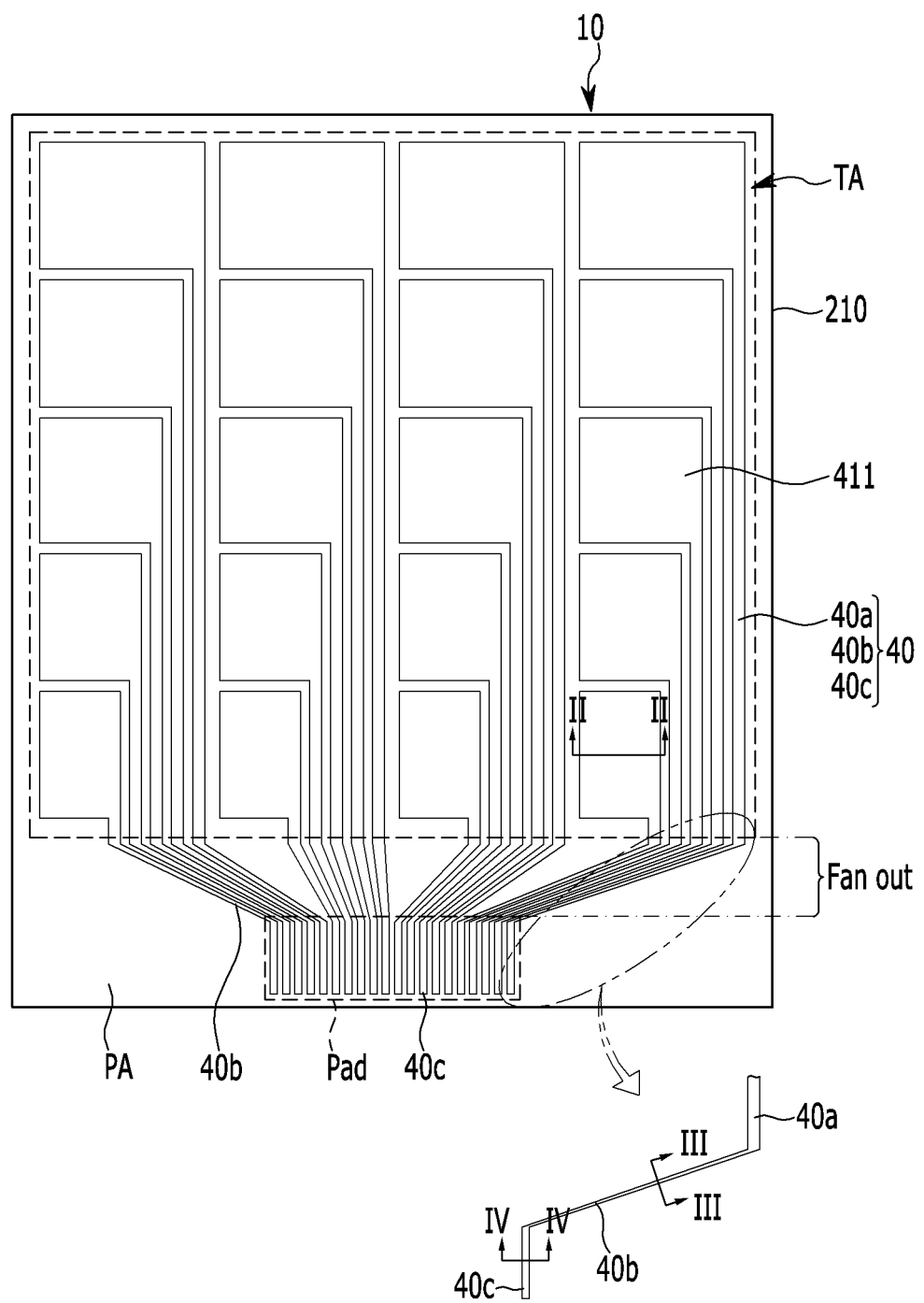
FIG. 1 is a plan view schematically showing a touch panel according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

First, a touch panel according to an exemplary embodiment will be described with reference to FIG. 1, FIG. 2, FIG. 3, FIG. 4, and FIG. 5.

Figure 2:
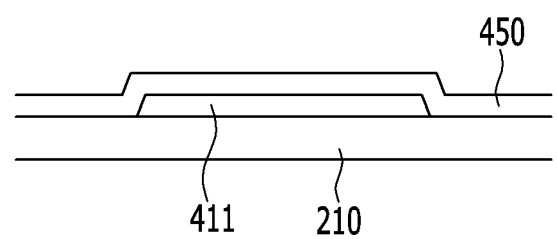
FIG. 2 is a cross-sectional view taken along section line II-II of FIG. 1 according to an exemplary embodiment.
Figure 3:
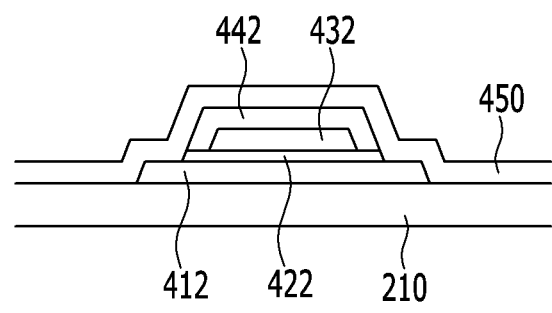
FIG. 3 is a cross-sectional view taken along section line III-III of FIG. 1 according to an exemplary embodiment.
Figure 4:
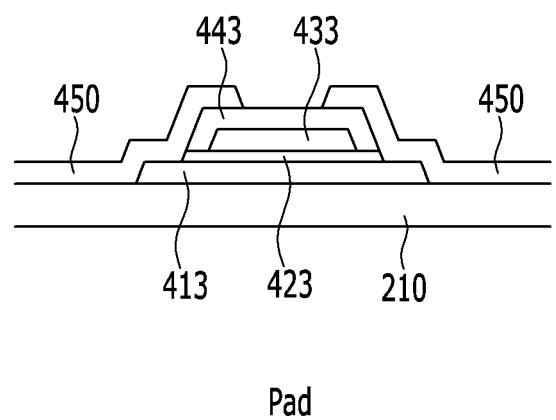
FIG. 4 is a cross-sectional view taken along section line IV-IV of FIG. 1 according to an exemplary embodiment.

FIG. 1 is a plan view schematically showing a touch panel according to an exemplary embodiment, FIG. 2 is a cross-sectional view taken along section line II-II of FIG. 1 according to an exemplary embodiment, FIG. 3 is a cross-sectional view taken along section line III-III of FIG. 1 according to an exemplary embodiment, and FIG. 4 is a cross-sectional view taken along section line IV-IV of FIG. 1 according to an exemplary embodiment.

FIG. 1 shows an overall structure of a touch panel 10 according to an exemplary embodiment. FIG. 1 shows an illustrative arrangement and connection relationship of components of the touch panel 10, but it may not reflect, at least in some parts, an actual shape or connection relationship, a ratio, an interval, and the number of respective components, and the like, and some components may not be shown in the drawings.

The touch panel 10 may include a substrate 210 and a plurality of touch electrodes 411 disposed on the substrate 210. The touch electrodes 411 may be disposed on an outer surface of a display panel including pixels configured to display an image of an organic light emitting diode display, a liquid crystal display, or the like (e.g., an on-cell type), and may also be disposed in the display panel (an in-cell type). Further, the touch electrodes 411 may be disposed on a separate substrate, which may include or may be made of a transparent insulator such as glass, plastic, or the like, to be attached onto the display panel (an add-on type). The touch electrodes 411 sense a touch input of a user, e.g., user's finger, a stylus, etc.

The touch panel 10 may be flexible, and in this case, the substrate 210 may include or may be made of thermoplastic semi-crystalline polymer such as polyethylene terephthalate (PET), polyethylene naphthalate (PEN), polyethylene ether ketone (PEEK), or the like, thermoplastic amorphous polymer such as polycarbonate (PC), polyethylene sulfonate (PES), or the like, and plastic such as polyimide (PI), polyarylate (PAR), or the like having relatively high thermal resistance.

The touch electrodes 411 are disposed on a touch active area (TA) capable of sensing a touch, and form a touch sensor sensing the touch and the location of the touch input. Here, the touch may include a case (non-contact touch) in which an object hovers in a state in which the object is located in proximity to or approaches the touch panel as well as a case (contact touch) in which the object is in contact with the touch panel.

The touch electrodes 411 may be arranged in a matrix shape having rows and columns of arranged touch electrodes 411, and may be physically and electrically separated from each other. The touch electrodes 411 may have different sizes depending on a position (see e.g., FIG. 1). The touch electrodes 411 may have various shapes, such as substantially a quadrangular shape, a triangular shape, a circular shape, and the like, and may also have an edge which is unevenly formed.

The touch electrodes 411 may be connected to a touch controller (not shown) through a touch signal line 40, which corresponds to one or the touch electrodes 411. In this case, each touch electrode 411 may form a self-capacitor as a touch sensor. The self-capacitor may receive a driving signal so as to be charged with a predetermined amount of charge, and if there is a contact with an external object, the charged amount of charge is changed (e.g., a current flows through the contacted external object), such that the self-capacitor may output an output signal different from the received driving signal.

In accordance with an exemplary embodiment, the neighboring touch electrodes 411 may a mutual capacitor serving as the touch sensor. The mutual capacitor may receive the driving signal through one of the neighboring touch electrodes 411, and may output a change of the amount of charge by the contact with the external object through the other touch electrode as the output signal. Some of the plurality of touch electrodes 411 may form the self-capacitor, some thereof may form the mutual capacitor, and may also simultaneously form two types of capacitors.

The touch electrode 411 may include or may be formed of a nanowire, such as a silver nanowire (AgNW). Hereinafter, a case in which the touch electrode 411 includes or is formed of the nanowire will be described by way of example. In the case in which the touch electrode 411 includes or is formed of the nanowire, since there is relatively less risks to disconnect the nanowire even though stress is applied to the nanowire, the nanowire may provide an advantage in implementing a flexible touch panel. However, the touch electrode 411 may also be formed of a mesh pattern such as a metal mesh, a transparent conductive oxide (TCO) such as indium tin oxide (ITO) and indium zinc oxide (IZO), or a conductive material such as carbon nano tube (CNT), graphene, or the like.

Referring to FIG. 2, a passivation layer 450 may be disposed on the touch electrodes 411. The passivation layer 450 may include or may be formed of an inorganic material, such as silicon oxide ($SiO_x$, SiON, $SiON_x$) or silicon nitride ($SiN_x$). In a case in which the substrate 210 is formed of plastic, since the substrate 210 is vulnerable to heat because of the characteristic of the material, it may be difficult to form the passivation layer 450 by a high temperature process, and in this case, the passivation layer 450 may be formed of possible silicon oxide at a low temperature process.

Referring to FIG. 1, each of the touch electrodes 411 may be connected to the corresponding touch signal line 40. Similar to the touch electrodes 411, the touch signal lines 40 may be disposed on the substrate 210 and may include a layer formed of the nanowire.

The touch signal lines 40 may be mainly disposed in a touch active area TA, include a connection portion 40a which is directly connected to the touch electrode 411, and include a fanout portion 40b and a pad portion 40c formed to extend to a peripheral area PA around the touch active area TA. The fanout portion 40b may extend from the connection portion 40a.

Each pad portion 40c may correspond to a flexible circuit board (not shown) for a connection with the touch controller (not shown) or a pad to which a driving integrated chip (IC) (not shown) is attached. The fanout portion 40b may be a portion which is converged like a fan shape, for example, while extending from a plurality of connection portions 40a to be bent, in order to form the above-mentioned pad.

Since the plurality of connection portions 40a are converged in a diagonal direction in order to form a plurality of pad portions 40c, the fanout portions 40b may be formed to have a narrower width than the width of the connection portion 40a, for example, a width of several tens nanometers or less, in order to be disposed to be spaced apart from each other. Further, reducing a bezel size in the display device is preferable. In order to reduce the bezel size, the peripheral area PA needs to be narrowly formed to reduce a dead space in the touch panel 10. Therefore, it may be difficult to sufficiently secure a space for forming the fanout portion 40b, the width of the fanout portion 40b may be further limited. In the case in which the touch electrode 411 is formed of the nanowire and the touch signal line 40 is also formed of the nanowire, resistance may be significantly increased or the nanowire may be disconnected on their structural characteristics in the fanout portion 40b. In order to address the above-mentioned problem caused by the configuration and size of the fanout portion 40b of the touch signal line 40 upon the formation of the touch panel 10 with the nanowire, the fanout portion 40b may have a structure in which a metal line is stacked on the nanowire according to an exemplary embodiment. Since the pad portion 40c may also cause the similar problem and may be formed by the same process as the fanout portion 40b, the pad portion 40c may also have the above-mentioned stack structure.

In FIG. 3 and FIG. 4, stack structures of the fanout portion 40b and the pad portion 40c of one touch signal line 40 are illustrated, respectively.

With reference to FIG. 3, the fanout portion 40b will be described. A first conductor 412, an etch stopper 422, a second conductor 432, and a third conductor 442 may be sequentially disposed on the substrate 210, and the passivation layer 450 covering the above-mentioned components may be disposed thereon.

Similar to the touch electrode 411, the first conductor 412 may include or may be formed of the nanowire, such as AgNW. The first conductor 412 may have a width of several ten micrometers, for example, about 50 micrometers or less, and may be about 10 micrometers or less. Accordingly, it may be difficult to guarantee a desired transmission quality of a touch signal just by having the first conductor 412.

The second conductor 432 may be disposed on the first conductor 412 so as to be overlapped with the first conductor 412. The second conductor 432 may be formed to have a width narrower than the first conductor 412. The second conductor 432 may include or may be formed of a material having excellent signal transmission capability in order to prevent or reduce a degradation of signal quality due to a resistance increase or a disconnection which may be caused as the width of the touch signal line 40 decreases. For example, the second conductor 432 may include or may be formed of a low resistance metal or alloy, and examples of the above-mentioned metal may include molybdenum (Mo), copper (Cu), silver (Ag), titanium (Ti), aluminum (Al), and the like. For example, molybdenum (Mo), as the second conductor 432, may be preferable with AgNW as the first conductor 412. The etch stopper 422 may be omitted according to an exemplary embodiment.

The third conductor 442 may be disposed over the second conductor 432 so as to be overlapped with the second conductor 432 in order to prevent the second conductor 432 from being damaged by oxidization, other physical, chemical damages, or the like. The third conductor 442 may be formed to entirely cover the second conductor 432 as shown in FIG. 3. More specifically, the third conductor 442, e.g., an Indium Tin Oxide (ITO) may cover the top surface and the side surfaces of the second conductor 432 while the bottom surface of the second conductor 432 is covered by another layer, e.g., at least one of the first conductor 412 and the etch stopper 422. Therefore, the third conductor 442 may be formed to surround side surfaces as well as the top surface of the second conductor 432 before disposing the passivation layer 450. Although the case in which the third conductor 442 has a width narrower than the first conductor 412 is shown, the third conductor 442 may have the same width as that of the first conductor 412. The third conductor 442 may include or may be formed of a material capable of effectively preventing oxygen, or the like from being permeated into the second conductor 432, but the third conductor 442 includes, or is formed of, a conductive material so as to be electrically connected to the flexible circuit board, the driving IC, or the like in the pad portion 40c, which is another portion of the touch signal lines 40. The third conductor 442 may include or may be formed of transparent conductive oxides such as ITO and IZO, for example.

The etch stopper 422 may be disposed between the first conductor 412 and the second conductor 432. The etch stopper 422 may be used to prevent a layer for forming the first conductor 412 from being etched together when the second conductor 432 is formed by a patterning process, for example. The etch stopper 422 may have substantially the same width as that of the third conductor 442. Since the second conductor 432 may need to be electrically connected with the first conductor 412, the etch stopper 422 positioned between the first conductor 412 and the second conductor 432 may include or may be formed of a conductive material. For example, in a case in which the first conductor 412 is formed of a silver nanowire and the second conductor 432 is formed of molybdenum or copper, the etch stopper 422 may be formed of a transparent conductive oxide, such as ITO or IZO. However, in a case in which the second conductor 432 is formed using an etchant having high etch selectivity for the first conductor 412, the etch stopper 422 may be omitted.

The passivation layer 450 may be disposed to be positioned on the third conductor 443 to cover the fanout portion 40b, and may be formed in the same layer as the layer of the passivation layer 450 formed on the touch electrode 411. The passivation layer 450 may include or may be formed of the inorganic material such as silicon oxide or silicon nitride, as described above.

The pad portion 40c will be described below with reference to FIG. 4. The pad portion 40c generally has the same stack structure as that of the fanout portion 40b. The pad portion 40c may have a first conductor 413, an etch stopper 423, a second conductor 433, and a third conductor 443 which are sequentially disposed on the substrate 210, and may have the passivation layer 450 covering the above-mentioned components which is disposed on the third conductor 443. The first conductor 413, the etch stopper 423, the second conductor 433, and the third conductor 443 of the pad portion 40c are each disposed on the same layer and of the same material as the first conductor 412, the etch stopper 422, the second conductor 432, and the third conductor 442 of the fanout portion 40b. In addition, the third conductor 443 may be disposed to surround side surfaces as well as the top surface of the second conductor 433. The second conductor 433 may have a width narrower than the widths of the first conductor 413 and the third conductor 443, and the third conductor 443 may have a width narrower than the width of the first conductor 413 or may have substantially the same width as that of the first conductor 413. In a case in which the etch stopper 422 of the fanout portion 40b is omitted, the etch stopper 423 of the pad portion 40c may also be omitted. Besides, unless otherwise being described, the pad portion 40c may share structural and material characteristics with the fanout portion 40b.

The passivation layer 450 may be disposed to cover the pad portion 40c and the fanout portion 40b. However, unlike the fanout portion 40b, in the pad portion 40c as shown in FIG. 4, a portion of the passivation layer 450 covering the third conductor 443 may be removed, such that a partial portion of the top surface of the third conductor 443 is exposed to the outside. This is to form a contact portion which may be electrically connected to the flexible circuit board and the driving IC which are attached to the pad.

According to another process, the passivation layer 450 is first disposed on the second conductor 433. Then, the second conductor 433 is exposed by removing a portion of the passivation layer 450, and the third conductor 443 may then be disposed on the exposed second conductor 433. In this case, since the third conductor 443 is completely exposed over the passivation layer 450, the third conductor 443 may have a wide contact area. However, during a process of stacking and patterning a layer for forming the third conductor 443, the passivation layer 450 which is formed prior to the third conductor 443 may be frequently damaged, such that a function of the passivation layer 450 may be degraded and some portions of the passivation layer 450 may be undesirably removed. Particularly, since it is difficult to apply a high temperature process when a plastic substrate is used as the substrate 210, the passivation layer 450 may be formed of an oxide-based inorganic material such as silicon oxide. Since the oxide-based inorganic material is relatively easily damaged in a subsequent patterning process and may be vulnerable to moisture permeation, it may be insufficient to protect the second conductor 433 from moisture, and the like. The above-mentioned phenomenon may also occur in the fanout portion 40b.

Accordingly, in accordance with an exemplary embodiment (e.g., the layer configurations shown in e.g., FIG. 3 and FIG. 4), since the third conductor 443 is first formed and the passivation layer 450 is then formed on the third conductor 443, the damage or the delamination of the passivation layer 450 due to the formation of the third conductor 443 does not occur. In addition, since the third conductor 443 is disposed to have a structure surrounding even the sides of the second conductor 433 immediately after disposing the second conductor 433, the third conductor 443 may serve to prevent oxygen, moisture, or the like from being permeated into the second conductor 433 in a more effective way.

Each of the touch electrodes 411 illustrated in FIG. 2 may extend and connected to the first conductor 412 of the fanout portion 40b of the corresponding touch signal line 40 (see FIG. 1 and FIG. 3). The first conductor 412 of the fanout portion 40b of the corresponding touch signal line 40 is connected to the first conductor of the pad portion 40c of the corresponding touch signal line 40 (see FIG. 1 and FIG. 4). A touch electrode 411, a first conductor 412 of the fanout portion 40b corresponding to the touch electrode 411, and a first conductor 413 of the pad portion 40c corresponding to the touch electrode 411 may be connected and formed of the same material by patterning the first conductive layer 41 shown in e.g., FIG. 9. Similarly, the etch stoppers 422, 423 may be formed by etching the same layer, and thus, they may be connected to each other and formed of the same material. The second conductors 432, 433 may be formed by etching the same layer, and thus, they may be connected to each other and formed of the same material. The third conductors 442, 443 may be formed by etching the same layer, and thus, they may be connected to each other and formed of the same material. The first conductor 413 of the pad portion 40c and the second conductor 433 of the pad portion 40c may be electrically connected to the touch controller 700 shown in FIG. 15. After forming the third conductors 442 and 443, the passivation layer 450 may be disposed on the third conductors 442 and 443.

Hereinafter, another exemplary embodiment will be described with reference to FIG. 5, FIG. 6, and FIG. 7.

Figure 5:
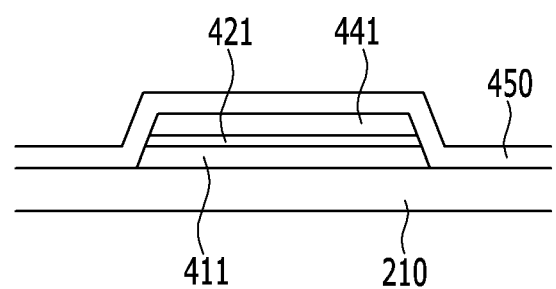
FIG. 5, FIG. 6, and FIG. 7 are cross-sectional views of a touch panel according to an exemplary embodiment.
Figure 6:
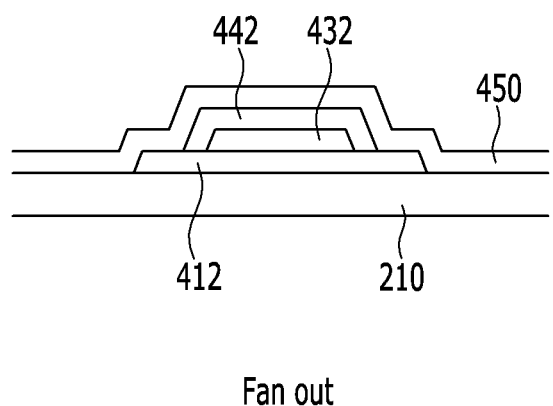
Figure 7:
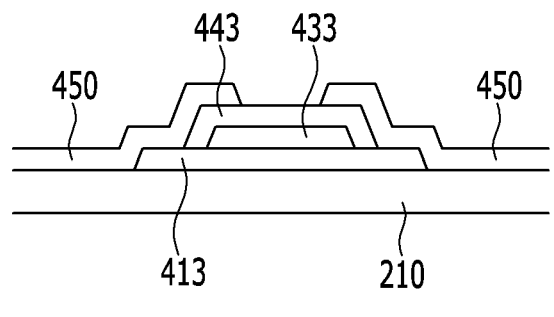

FIG. 5, FIG. 6, and FIG. 7 are cross-sectional views of a touch panel according to an exemplary embodiment.

First, in FIG. 5, the touch electrode of the touch active area is shown. Unlike the exemplary embodiment described above in which the touch electrode is formed in one conductive layer, the touch electrode is formed in a plurality of conductive layers. For example, the touch electrode may be formed in three layers including a first conductor 411, a second conductor 421, and a third conductor 441. Here, the first conductor 411 may be the same layer as the layer of the touch electrode 411 of FIG. 2, and the second conductor 421 and the third conductor 441 are further disposed on the first conductor 411. The second conductor 421 and the third conductor 441 may be formed by not removing a portion overlapped with the first conductor 411 upon the patterning after stacking layers for forming the etch stoppers 422 and 423 of the fanout portion and pad portion 40b and 40c, respectively, and the third conductors 442 and 443 (see FIG. 3 and FIG. 4).

In a case in which the fanout portion and the pad portion 40b and 40c do not include the etch stoppers 422 and 423, the touch electrode may not include the second conductor 421.

Referring to FIG. 6 and FIG. 7, unlike the exemplary embodiment of FIGS. 3 and 4, the fanout portion 40b and the pad portion 40c have a structure in which the etch stoppers 422 and 423 are not disposed between the first conductor 412 and the second conductor 432 and between the first conductor 413 and the second conductor 433. The first conductor 412 and the second conductor 432 are directly in contact with each other, and the first conductor 413 and the second conductor 433 are directly in contact with each other. As describe above, when the second conductors 432 and 433 are formed, if an etchant which does not etch the first conductors 412 and 413 is used, the first conductors 412 and 413 are not damaged even though the etch stoppers are not formed between the first conductors 412 and 413 and the second conductors 432 and 433, respectively.

Hereinafter, a method for manufacturing a touch panel according to an exemplary embodiment will be described with reference to FIG. 8 through FIG. 13. Unless particularly stated, FIG. 1 through FIG. 4 may also be referenced together with FIG. 8 through FIG. 13.

FIG. 8, FIG. 9, FIG. 10, FIG. 11, FIG. 12, and FIG. 13 are cross-sectional views showing a process of manufacturing a touch panel according to an exemplary embodiment.

Figure 8:
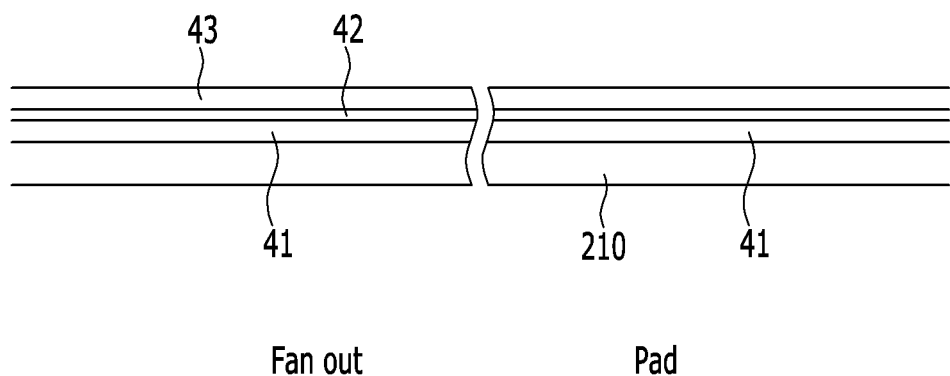
FIG. 8, FIG. 9, FIG. 10, FIG. 11, FIG. 12, and FIG. 13 are cross-sectional views showing a process of manufacturing a touch panel according to an exemplary embodiment.

Referring to FIG. 8, a first conductive layer 41, an etch stopping layer 42, and a second conductive layer 43 are sequentially stacked on the substrate 210. The substrate 210 may include or may be formed of an insulating material, such as glass or plastic. The first conductive layer 41 may include or may be formed of a nanowire such as a silver nanowire, but is not limited thereto. The etch stopping layer 42 may be formed of a material which is not etched upon the patterning of the second conductive layer 43 while having conductivity, and may include or may be formed of, for example, transparent conductive oxide such as ITO or IZO. The second conductive layer 43 may include or may be formed of a metal material such as molybdenum (Mo), copper (Cu), silver (Ag), titanium (Ti), aluminum (Al), or the like.

Figure 9:
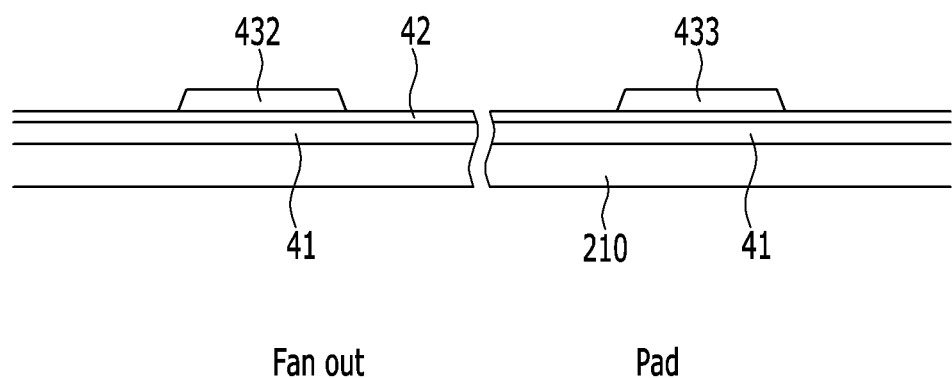

Referring to FIG. 9, the second conductor 432 of the fanout portion 40b and the second conductor 433 of the pad portion 40c are simultaneously formed by patterning the second conductive layer 43 illustrated in FIG. 8 by a photolithography process using a mask and an etching process. In this case, the second conductive layer 43 positioned in the touch active area TA of the touch panel 10 is removed (see e.g., FIG. 1). Since the etch stopping layer 42 is formed between the second conductive layer 43 and the first conductive layer 41, the first conductive layer 41 is not damaged by the patterning of the second conductive layer 43 even though an etchant having low selectivity, such as an etchant which may etch the first conductive layer 41, is used. However, in a case in which an etchant having high selectivity is used for the first conductive layer 41, the etch stopping layer 42 may be omitted.

Figure 10:
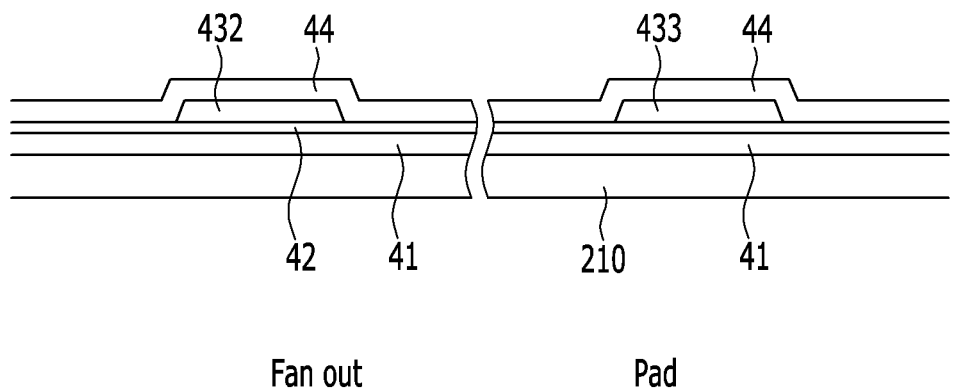

Referring to FIG. 10, the third conductive layer 44 may be disposed on the second conductors 432 and 433 and the etch stopping layer 42. The third conductive layer 44 may include or may be formed of, for example, transparent conductive oxide such as ITO or IZO, and may also be formed of the same material of the etch stopping layer 42.

Figure 11:
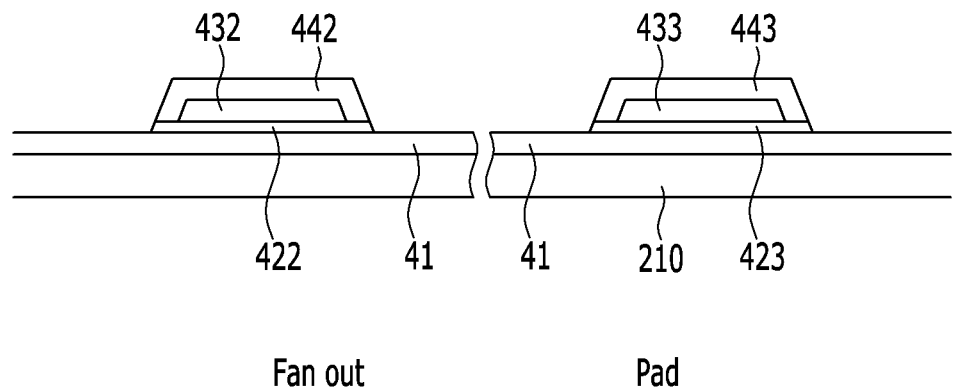

Referring to FIG. 11, the third conductors 442 and 443 surrounding the second conductors 432 and 433, respectively, may be formed on the second conductors 432 and 433, respectively, by patterning the third conductive layer 44. Therefore, the third conductors 442 and 443 are formed to have a width wider than the second conductors 432 and 433, respectively. Upon the patterning of the third conductive layer 44, the etch stopping layer 42 is patterned together, thereby forming the etch stoppers 422 and 423. Therefore, the patterning of the third conductive layer 44 and the etch stopping layer 42 are simultaneously performed by using one mask, and the third conductors 442 and 443 and the etch stoppers 422 and 423 have substantially the same width. In a case in which the etch stopping layer 42 is formed of a material different from the third conductive layer 44, an etchant capable of etching both the etch stopping layer 42 and the third conductive layer 44 may be used. Upon the patterning of the third conductive layer 44, the third conductive layer 44 and the etch stopping layer 42 in the touch active area TA are removed, such that the first conductive layer 41 in the touch active area TA may be exposed to the outside.

Figure 12:
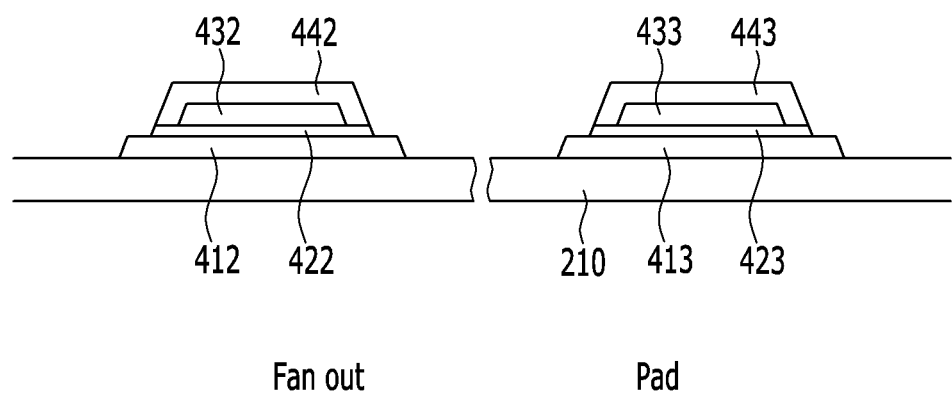

Referring to FIG. 12, the first conductors 412 and 413 of the fanout portion 40b and the pad portion 40c are formed below the etch stoppers 422 and 423 by patterning the first conductive layer 41. Upon the patterning of the first conductive layer 41, both top surfaces and side surfaces of the second conductors 432 and 433 are covered by the third conductors 442 and 443. Therefore, since the second conductors 432 and 433 are protected from the etchant by the third conductors 442 and 443, the second conductors 432 and 433 are not damaged even though an etchant having lower selectivity is used. Upon the patterning of the first conductive layer 41, the first conductive layer 41 of the touch active area TA is also patterned, such that the connection portion 40a of the touch electrode 411 and the touch signal line 40 is formed as shown in FIG. 1 and FIG. 2.

In accordance with an exemplary embodiment, the first conductive layer 41 may be patterned together upon the patterning of the third conductive layer 44 and the etch stopping layer 42. For example, in a case in which the third conductive layer 44 and the etch stopping layer 42 are formed of ITO, the first conductive layer 41 is formed of the silver nanowire, and the etchant capable of etching both ITO and the silver nanowire is used, all of three layers may be patterned by using one mask. The third conductors 442 and 443, the etch stoppers 422 and 423, and the first conductors 412 and 413 may have substantially the same width if the three layers are etched by one mask.

Figure 13:
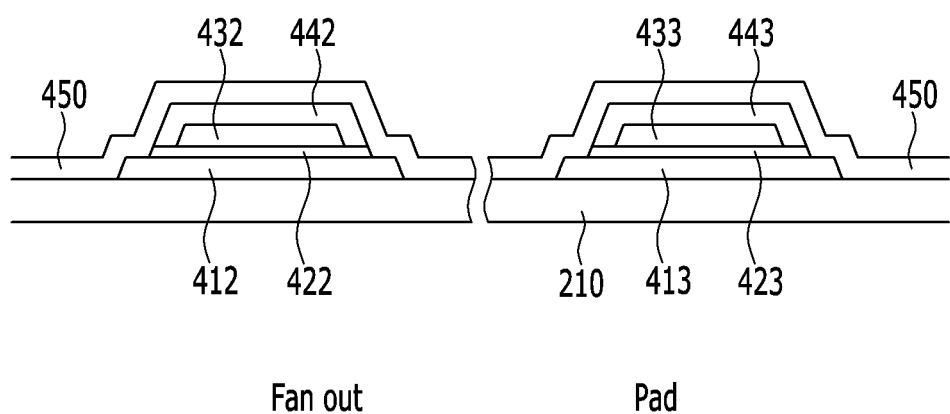

Referring to FIG. 13, after all conductors configuring the fanout portion 40b and the pad portion 40c are formed, the passivation layer 450 covering all the conductors may be disposed. The passivation layer 450 may include or may be formed of silicon oxide, silicon nitride, or the like. The passivation layer 450 is also completely formed on the touch electrode 411 and the connection portion 40a of the touch active area TA, to protect the conductor from potential damages. Since the passivation layer 450 is formed after forming the third conductors 442 and 443 by patterning the third conductive layer 44, the passivation layer 450 is not damaged during a manufacture process of the touch panel 10. In addition, since the third conductors 442 and 443 completely cover the second conductors 432 and 433, the third conductors 442 and 443 may function as a buffer layer even in a case in which moisture, or the like is permeated through the passivation layer 450.

After the passivation layer 450 is formed, the passivation layer 450 is patterned so that a portion of the third conductor 443 is exposed to the outside only in the pad portion 40c, thereby forming the touch panel 10 as shown in FIG. 1 through FIG. 4. The third conductor 443 serves to electrically connect the second conductor 433 to the flexible circuit board, or the like attached onto the third conductor 443.

A principle and method of sensing a touch will be described in more detail with reference to FIG. 14.

Figure 14:
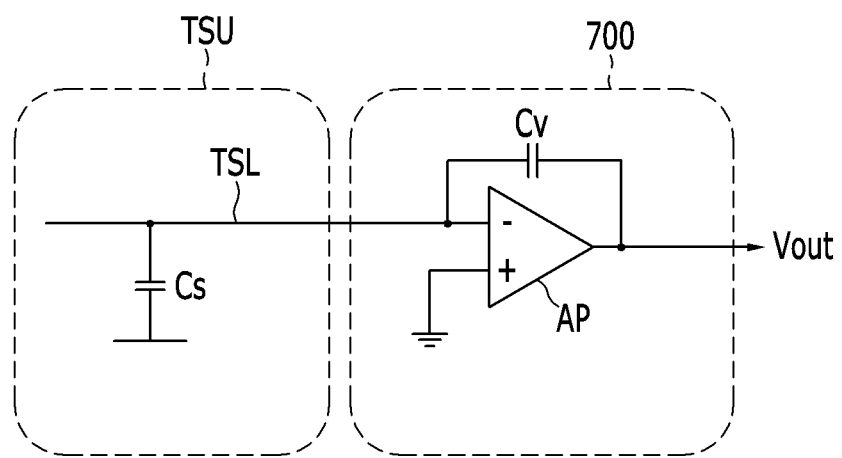
FIG. 14 is a circuit diagram of a touch sensor and a touch signal processing unit according to an exemplary embodiment.

FIG. 14 is a circuit diagram of a touch sensor and a touch signal processing unit according to an exemplary embodiment.

Referring to FIG. 1 and FIG. 14, in a case of self-capacitive type, each of the touch electrodes 411 forms a self-capacitor Cs which may be formed with a common electrode of a pixel, for example, and as a result, the self-capacitor Cs is formed in substantially a vertical direction. The touch electrode 411 is applied with a driving signal from a touch controller 700 through a touch signal line TSL and transmits an output signal. The driving signal may have various waveforms and voltage levels, may include a pulse which is periodically output, and may also include at least two different voltage levels. When the driving signal is applied to the touch electrode 411, the self-capacitor Cs is charged with charge and the touch electrode 411 outputs the output signal. When the corresponding touch electrode 411 is not touched, since an amount of charge charged in the self-capacitor Cs is not changed, the touch electrode 411 outputs substantially the same output signal as the driving signal, but when the corresponding touch electrode 411 is touched, the amount of charge is changed, such that the output signal is changed. The touch controller 700 generates a sensing signal Vout by processing the above-mentioned change as described above, and the touch controller 700 may include a signal processing unit to provide the above-mentioned function.

The touch controller 700 may receive and process the output signal from the touch signal line TSL, to generate touch information such as whether or not there is a touch, a touch position, and the like. For this purpose, the touch controller 700 may include a plurality of amplifiers AP connected to the touch signal line TSL. The amplifier AP may include a capacitor Cv connected between an inverting terminal (−) and an output terminal. A non-inverting terminal (+) of the amplifier AP is connected to a predetermined voltage such as a ground voltage, or the like, and the inverting terminal (−) of the amplifier AP is connected to the touch signal line TSL. The amplifier AP, which is a current integrator, may generate the sensing signal Vout by integrating the output signal from the touch signal line TSL during a predetermined time (e.g., one frame).

In a case of a mutual capacitive type, the driving signal such as a pulse wave may be input to one electrode (input electrode) of neighboring touch electrodes, and a direct current voltage may be input to the other electrode (output electrode). Even though the direct current voltage is applied to the output electrode, the voltage may be varied by a coupling with a swing driving signal. An electric field and capacitance due to a potential difference are formed between the input electrode and the output electrode. If the capacitance is changed by a contact of a finger, a touch pen, or the like, since a range of a voltage change of the output electrode (not shown) is changed, the touch may be sensed based on the above mentioned change.

In accordance with an exemplary embodiment, the touch panel 10 may be driven so that a touch sensing by both the self-capacitor type and a touch sensing by the mutual capacitor type are performed. For example, for every frame, the touch electrode 411 may be driven in the self-capacitor type during a first period and the touch electrode 411 may be driven in the mutual capacitor type during a second period.

Figure 15:
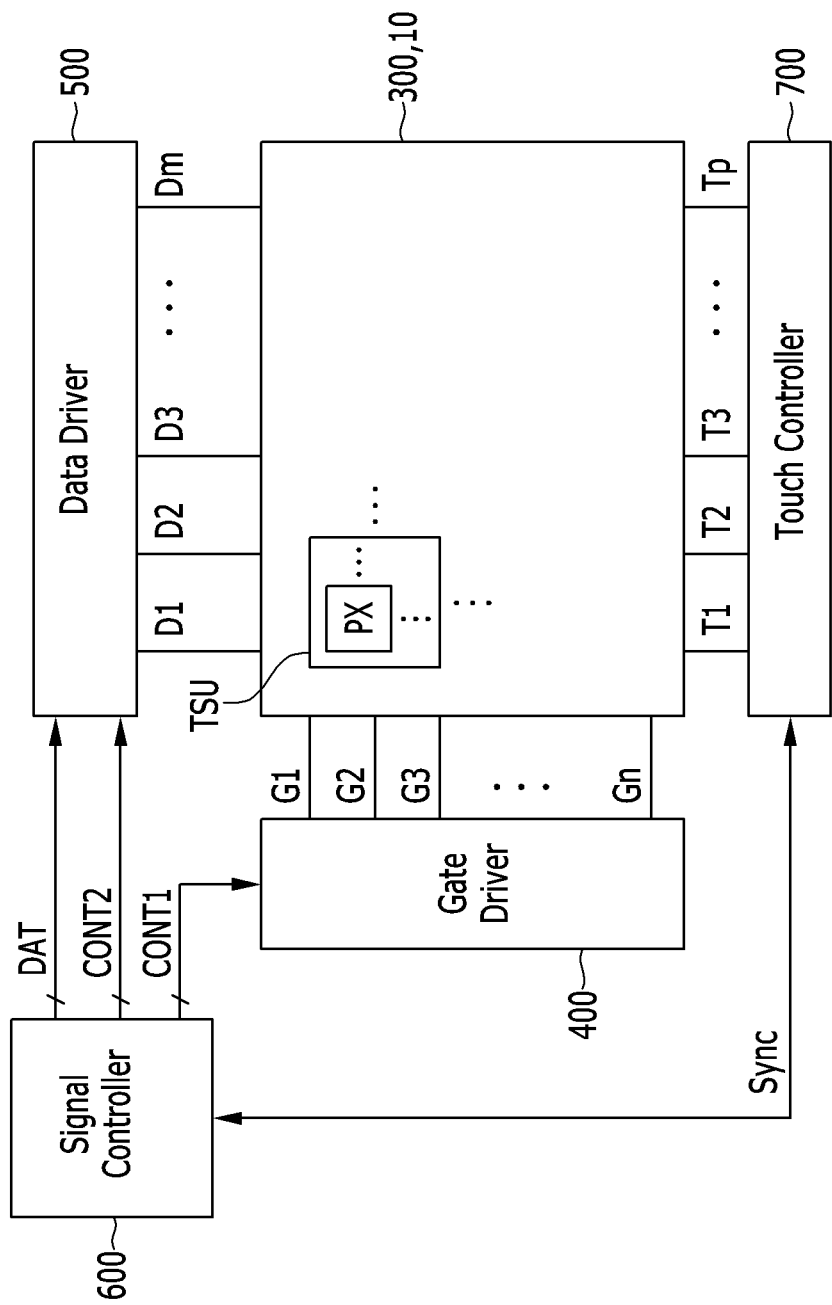
FIG. 15 is a layout view of a display device including a touch panel according to an exemplary embodiment.

FIG. 15 is a layout view of a display device including a touch panel according to an exemplary embodiment.

Referring to FIG. 15, a display device including a touch panel according to an exemplary embodiment includes a display panel 300, a gate driver 400 and a data driver 500 connected to the display panel 300, respectively, and a display controller (or "signal controller") 600 controlling the gate driver 400 and the data driver 500. The display device also includes a touch panel 10 (see e.g., FIG. 1) and a touch controller 700 controlling the touch panel 10. The touch panel 10 in which the touch electrodes 411 are formed may be attached to an outer surface of the display panel 300. The touch electrodes 411 may be directly formed on the outer surface of or in the display panel 300, such that the display panel 300 may also operate as the touch panel 10.

The display panel 300 includes a plurality of gate lines G1 to Gn, a plurality of data lines D1 to Dm, and a plurality of pixels PX connected to a corresponding one of the gate lines G1 to Gn and a corresponding one of the data lines D1 to Dm and arranged approximately in a matrix shape. The touch panel 10 includes a plurality of touch signal lines T1 to Tp, and a plurality of touch sensor units TSU connected to the touch signal lines T1 to Tp and arranged approximately in a matrix shape. The touch sensor unit TSU may be formed by the touch electrodes 411 described above.

The gate lines G1 to Gn extend substantially in a horizontal direction, and transfer gate signals including a gate-on voltage turning on a switching element, such as a thin film transistor (TFT) connected to each pixel PX and a gate-off voltage turning off the switching element. The data lines D1 to Dm extend substantially in a vertical direction, and transfer data voltages to the switching element. For example, the gate lines G1 to Gn may be connected to a corresponding gate electrode of the TFT to switch on the TFT by applying the gate-on voltage, and the data lines D1 to Dm may be connected to a corresponding source electrode of the TFT to provide data signals by applying the data voltages.

When the switching element is turned on according to the gate-on voltage, the data voltage applied to the data line is applied to the pixel.

The pixel PX is a basic unit for displaying an image, and one pixel uniquely displays one of primary colors or a plurality of pixels alternately display the primary colors over time, thereby making it possible to display an intended color image by a spatial or temporal summation of the above-mentioned primary colors. The pixel PX may generally have a quadrangular shape, but is not limited thereto. Each pixel PX is applied with a common voltage and the data voltage.

The touch signal lines T1, T2, T3, . . . , Tp (hereinafter "T1 to Tp") are connected to the touch sensor units TSU to transfer the driving signals and the output signals. Each of the touch sensor units TSU may correspond to at least one of the touch electrodes 411 shown in FIG. 1. In a case of the self-capacitor type, the touch signal lines T1 to Tp may be input lines transferring the driving signals to the touch sensor units TSU and output lines transferring the output signals from the touch sensor units TSU at the same time. In a case of the mutual capacitor type, some of the touch signal lines T1 to Tp may be the input lines transferring the driving signals to the touch sensor units TSU and some thereof may be the output lines transferring the output signals from the touch sensor units TSU.

The touch sensor unit TSU may generate the output signal according to the touch in a self-capacitive type. The touch sensor units TSU may receive the driving signals from the touch signal lines T1 to Tp, and output the output signals based on a change in capacitance by the touch of an external object such as a finger, a pen, or the like, through the touch signal lines T1 to Tp. The touch sensor unit TSU may also be operated in a mutual capacitive type.

The display controller 600 may receive input image signals corresponding to data signals for red pixels R, data signals for green pixels G, and data signals for blue pixels B, and a control signal CONT thereof, e.g., a horizontal synchronization signal Hsync, a vertical synchronization signal Vsync, a clock signal CLK, a data enable signal DE, and the like, from an external graphic processing unit (not shown). The display controller 600 processes the image signals R, G, and B to be suitable for an operation condition of the display panel 300 based on the image signals R, G, and B, and the control signal CONT, and then generates and outputs image data DAT, a gate control signal CONT1, a data control signal CONT2, and the clock signal (not shown). The display controller 600 may also output a synchronization signal Sync to the touch controller 700 and receive touch information from the touch controller 700.

The gate control signal CONT1 includes a start pulse vertical signal STV instructing a start of the gate signal, and a clock pulse vertical signal CPV which is used as a basis of the generation of the gate-on voltage. An output period of the start pulse vertical signal STV may be matched to one frame (or refresh rate). The gate control signal CONT1 may further include an output enable signal OE (not shown) limiting duration of the gate-on voltage.

The data control signal CONT2 includes a start pulse horizontal signal STH instructing a start of transmission of the image data DAT to pixels in one row, and a load signal TP instructing an application of corresponding data voltages to the data lines D1 to Dm, and the like. In a case in which the display panel 300 is a liquid crystal display panel, the data control signal CONT2 may further include a reverse signal RVS reversing polarity of the data voltage for the common voltage.

The gate driver 400 applies the gate signals, which are the gate-on voltage or the gate-off voltage, to a corresponding one of the gate lines G1 to Gn, according to the gate control signal CONT1.

The data driver 500 receives the data control signal CON2 and the image data DAT from the display controller 600, converts the image data DAT into the data voltages using a grayscale voltage generated by a grayscale voltage generator (not shown), and applies the data voltages to a corresponding one of the data lines D1 to Dm.

The touch controller 700 transmits the input signal to the touch sensor unit TSU and receives the output signal from the touch sensor unit TSU, thereby generating the touch information. The touch controller 700 may include a signal processing unit processing the output signal from the touch sensor unit TSU.

According to an exemplary embodiment, corrosion of a metal wiring may be prevented by a transparent conductive oxide wiring covering the metal wiring. In addition, since the transparent conductive oxide wiring is formed below a passivation layer prior to the formation of the passivation layer, it is possible to prevent properties of the transparent conductive oxide from being degraded, and such a phenomenon that the passivation layer is damaged or delaminated may be prevented. Besides, there are advantageous effects which are described throughout the specification or may be understood therefrom.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch panel comprising:
a substrate;
touch electrodes disposed on the substrate, the touch electrodes being configured to sense a touch input; and
touch signal lines connected to a corresponding touch electrode of the touch electrodes, each of the touch signal lines comprising a fanout portion and a pad portion, the pad portion being configured to form an electrical connection with a touch controller,
wherein:
each of the fanout portion and the pad portion comprises a first conductor, a second conductor disposed on the first conductor, a third conductor disposed on the second conductor, and a passivation layer disposed on the third conductor; and
a width of the first conductor is wider than a width of the third conductor.

2. The touch panel of claim 1, wherein:
the third conductor of the pad portion surrounds side surfaces of the second conductor of the pad portion; and
the third conductor of the fanout portion surrounds side surfaces of the second conductor of the fanout portion.

3. The touch panel of claim 2, wherein:
the touch electrodes and the first conductor are formed of nanowire.

4. The touch panel of claim 3, wherein:
the second conductor consists of a metal different from materials of the first conductor conductors and the third conductor.

5. The touch panel of claim 4, wherein:
the third conductor comprises transparent conductive oxide.

6. The touch panel of claim 5, wherein:
the passivation layer comprises silicon oxide or silicon nitride; and
a portion of the passivation layer disposed on the pad portion comprises an opening exposing a top surface of the third conductor of the pad portion.

7. The touch panel of claim 1, further comprising:
a fourth conductor between the first conductor and the second conductor.

8. The touch panel of claim 7, wherein:
the fourth conductor comprises a same material as the third conductor.

9. The touch panel of claim 7, wherein the touch electrodes comprise:
a first layer formed of nanowirel;
a second layer formed of the same material as the fourth conductor disposed on the first conductor; and
a third layer formed of the same material as the third conductor disposed on the second conductor.

10. The touch panel of claim 1, wherein:
the width of the third conductor is wider than a width of the second conductor.

11. A method for manufacturing a touch panel, the touch panel comprising touch electrodes and touch signal lines connected to a corresponding touch electrode of the touch electrodes, each of the touch signal lines comprising a fanout portion and a pad portion, the method comprising:
forming a first conductive layer on a substrate;
forming an etch stopping layer on the first conductive layer;
forming and patterning a second conductive layer on the etch stopping layer to form a second conductor of the fanout portion and a second conductor of the pad portion;
forming, after patterning the second conductive layer, a third conductive layer on the second conductor of the fanout portion and the second conductor of the pad portion,
patterning the third conductive layer to form a third conductor of the fanout portion on the second conductor of the fanout portion and a third conductor of the pad portion on the second conductor of the pad portion;
patterning, after patterning the third conductive layer, the first conductive layer to form a first conductor of the fanout portion and a first conductor of the pad portion; and
forming a passivation layer on the third conductors and the touch electrodes.

12. The method of claim 11, wherein:
the second conductor of the pad portion is formed to have a width narrower than a width of the third conductor of the pad portion, and the third conductor of the pad portion is formed to surround side surfaces of the second conductor of the pad portion; and
the second conductor of the fanout portion is formed to have a width narrower than a width of the third conductor of the fanout portion, and the third conductor of the fanout portion is formed to surround side surfaces of the second conductor of the fanout portion.

13. The method of claim 11, further comprising:
patterning the etch stopping layer to form a fourth conductor of the fanout portion and a fourth conductor of the pad portion, the fourth conductor of the fanout portion being disposed between the first conductive layer and the second conductor of the fanout portion, the fourth conductor of the pad portion being disposed between the first conductive layer and the second conductor of the pad portion,
wherein the patterning of the etch stopping layer is performed simultaneously with the patterning of the third conductive layer.

14. The method of claim 13, wherein:
the third conductor of the pad portion is formed to be in contact with the fourth conductor of the pad portion while surrounding side surfaces of the second conductor of the pad portion; and
the third conductor of the fanout portion is formed to be in contact with the fourth conductor of the fanout portion while surrounding side surfaces of the second conductor of the fanout portion.

15. The method of claim 11, wherein:
the first conductive layer comprises nanowire.

16. The method of claim 15, wherein:
the second conductive layer consists of a metal different from materials of the first conductor of the fanout portion, the first conductor of the pad portion, the third conductor of the fanout portion, and the third conductor of the pad portion.

17. The method of claim 16, wherein:
the third conductive layer comprises transparent conductive oxide.

18. The method of claim 17, wherein:
the passivation layer comprises silicon oxide or silicon nitride; and
a portion of the passivation layer disposed on the pad portion is formed to comprise an opening exposing a top surface of the third conductor of the pad portion.

19. A touch panel comprising:
a substrate;
a touch electrode disposed on the substrate, the touch electrode being configured to sense a touch input;
a touch signal line connected to the touch electrode, the touch signal line comprising a fanout portion and a pad portion, the pad portion being configured to form an electrical connection with to a touch controller; and
a passivation layer disposed on the touch signal line and the touch electrode,
wherein the fanout portion comprises:
a first conductor extending from the touch electrode;
a second conductor disposed on the first conductor of the fanout portion;
a third conductor disposed on the second conductor of the fanout portion; and
a fourth conductor disposed between the first conductor of the fanout portion and the second conductor of the fanout portion, and
wherein the pad portion comprises:
a first conductor extending from the first conductor of the fanout portion;
a second conductor disposed on the first conductor of the pad portion, the second conductor of the pad portion extending from the second conductor of the fanout portion; and
a third conductor disposed on the second conductor of the pad portion; and
a fourth conductor disposed between the first conductor of the pad portion and the second conductor of the pad portion, the fourth conductor of the pad portion extending from the fourth conductor of the fanout portion.

\* \* \* \* \*